(12) United States Patent
Suzuki et al.

(10) Patent No.: US 8,493,879 B2
(45) Date of Patent: Jul. 23, 2013

(54) NODE APPARATUS, ROUTE CONTROL METHOD, ROUTE COMPUTATION SYSTEM, AND ROUTE COMPUTATION APPARATUS

(75) Inventors: Kazuya Suzuki, Tokyo (JP); Masahiro Jibiki, Tokyo (JP)

(73) Assignee: NEC Corporation, Tokyo (JP)

( * ) Notice: Subject to any disclaimer, the term of this patent is extended or adjusted under 35 U.S.C. 154(b) by 246 days.

(21) Appl. No.: 13/128,745

(22) PCT Filed: Nov. 11, 2009

(86) PCT No.: PCT/JP2009/006020
§ 371 (c)(1),
(2), (4) Date: May 11, 2011

(87) PCT Pub. No.: WO2010/058537
PCT Pub. Date: May 27, 2010

(65) Prior Publication Data
US 2011/0216668 A1    Sep. 8, 2011

(30) Foreign Application Priority Data
Nov. 19, 2008    (JP) ................................. 2008-295928

(51) Int. Cl.
*H04L 1/00* (2006.01)
(52) U.S. Cl.
USPC ............ 370/252; 370/230; 370/235; 370/242
(58) Field of Classification Search
USPC ........................................ 370/252, 229–238
See application file for complete search history.

(56) References Cited

U.S. PATENT DOCUMENTS

| 2002/0165981 A1* | 11/2002 | Basturk et al. ................. 709/242 |
| 2004/0006640 A1* | 1/2004 | Inderieden et al. ........... 709/242 |
| 2005/0027872 A1* | 2/2005 | Srinivas ........................ 709/227 |
| 2007/0159975 A1* | 7/2007 | Suzuki et al. ................. 370/235 |
| 2009/0010201 A1* | 1/2009 | Kawakami .................... 370/328 |

FOREIGN PATENT DOCUMENTS

| JP | 2001230776 A | 8/2001 |
| JP | 2007258926 A | 10/2007 |
| JP | 2008182676 A | 8/2008 |

OTHER PUBLICATIONS

International Search Report for PCT/JP2009/006020 mailed Dec. 8, 2009.
Y. Rekhter, Ed et al., "A Border Gateway Protocol 4 (BGP-4)", Network Working Group, RFC 4271, Jan. 2006, pp. 1-6.
J. Moy, "OSPF Version 2", Network Working Group, RFC 2328, Apr. 1998, pp. 1-3.

(Continued)

*Primary Examiner* — Luat Phung

(57) ABSTRACT

A node apparatus wherein when a topology change occurs on a network used for packet transfer between node apparatuses, the node apparatus performs dynamic route control for establishing a new normal route. The node apparatus has a device that receives, from another node apparatus, a route control message which includes information required for route determination; a device that computes a route on the network based on the received route control message; a device that sends another node apparatus a route control message which includes information required for said another node apparatus to determine a route on the network; a device wherein when receiving the route control message, this device computes an operation start time for route control operation by the route computation and the message sending, based on a distance between a topology change part and said node apparatus of oneself; and a device that controls the execution of the route control operation based on the computed operation start time.

43 Claims, 10 Drawing Sheets

OTHER PUBLICATIONS

G. Malkin, "RIP Version 2", Network Working Group, RFC 2453, Nov. 1998, pp. 1-4.

A Tachibana et al., "A Proposal of locating BGP Routing Failures based on Simulation Analysis", Meeting of IEICE Communications Society, B-16-6, 2008, p. 314.

* cited by examiner

NODE APPARATUS, ROUTE CONTROL METHOD, ROUTE COMPUTATION SYSTEM, AND ROUTE COMPUTATION APPARATUS

The present application is the National Phase of PCT/JP2009/006020, filed Nov. 11, 2009, which claims priority based on Japanese Patent Application No. 2008-295928, filed Nov. 19, 2008, the contents of which are incorporated herein by reference.

TECHNICAL FIELD

The present invention relates to a network system which directly performs route control, and specifically relates to a node apparatus, a route control method, a route computation system, and a route computation apparatus.

BACKGROUND ART

Accompanied with the spread of network techniques represented by the Internet, improvement in reliability for each network is a pressing need.

In recent years, reliability for a network has been improved by performing dynamic route control after preparing a redundant structure including node apparatuses and links for the network. In the network which executes the dynamic route control, the node apparatuses which form the network exchange information about connection statuses thereof. Based on such information, an optimum route is autonomously determined.

For example, if a node apparatus detects a failure in a link connected to the node apparatus or a node apparatus adjacent thereto (accordingly, a topology change) occurs, the node apparatus which detects the failure communicates the failure to other node apparatuses. Accordingly, all node apparatuses within the network perform route computation without considering the damaged node apparatus or link, so as to determine a new route.

As described above, even if a failure occurs, the dynamic route control makes it possible to continue the communication service using only the remaining node apparatuses and links.

In order to implement such dynamic route control, a standardization organization IFTF (Internet Engineering Task Force) defines standardized route control protocols such as BGP (Border Gateway Protocol)-4 (for example, see Non-Patent Document 1), OSPF (Open Shortest Path First) (for example, see Non-Patent Document 2), and RIP (Routing Information Protocol) (for example, see Non-Patent Document 3).

PRIOR ART DOCUMENT

Non-Patent Document

Non-Patent Document 1: Y. Rekhter, T. Li and S. Hares, "A Border Gateway Protocol 4 (BGP-4)", RFC 4271, pp. 1-6, Internet Engineering Task Force, 2006.
Non-Patent Document 2: J. Moy, "OSPF Version 2", RFC 2328, Internet Engineering Task Force, pp. 1-3, 1998.
Non-Patent Document 3: G. Malkin, "RIP Version 2", RFC 2453, Internet Engineering Task Force, pp. 1-4, 1998.

DISCLOSURE OF INVENTION

Problem to be Solved by the Invention

In order to shorten the service stop time due to occurrence of a failure, the node apparatus which detected the failure must communicate the failure to all nodes within the network as soon as possible. In this case, each node apparatus which receives the failure notification should also transfer the notification as soon as possible.

However, in the above-described Non-Patent Documents 1 to 3, when each node apparatus performs such an operation in the network, the load imposed on each node apparatus temporarily increases. When the load of each node apparatus increases due to the route computation, the node apparatuses cannot perform the other processes, so that it may not function as a node apparatus itself. Therefore, an increase in the processing load may affect the stability of the network.

In order to prevent such an increase in the load of each node apparatus, a various types of timer is used, which may be a transfer timer for managing a time measured from the reception of the notification to the transmission of the notification to an adjacent router or a computation start timer measured from the notification reception to the start of the route computation.

When the above-described temporary increase in the load for the route is prevented by setting such a timer to a relatively large value, the stability of the network can be improved. However, as a result, the service stop time due to the failure occurrence increases.

That is, the service stop time and the stability of the network have a trade-off relationship, and they are not easily compatible.

In light of the above circumstances, an object of the present invention is to provide a node apparatus, a route control method, a route computation system, and a route computation apparatus, which can shorten the service stop time without damaging the stability of the network.

Means for Solving the Problem

In order to solve the above-described problem, the present invention provides a node apparatus wherein when a topology change occurs on a network used for packet transfer between node apparatuses, said node apparatus performs dynamic route control for establishing a new normal route, and said node apparatus comprises:

a message receiving device that receives, from another node apparatus, a route control message which includes information required for route determination;

a route computing device that determines a route on the network based on the received route control message;

a message sending device that sends another node apparatus a route control message which includes information required for said another node apparatus to determine a route on the network;

a delay computing device wherein when receiving the route control message by the message receiving device, the delay computing device computes an operation start time for route control operation executed by the route computing device and the message sending device, based on a distance between a topology change part and said node apparatus of oneself; and an execution control device that controls the execution of the route control operation by the route computing device and the message sending device, based on the operation start time computed by the delay computing device.

In order to solve the above-described problem, the present invention also provides a route control method wherein when a topology change occurs on a network used for packet transfer between node apparatuses, the method is used for establishing a new normal route, and said method comprises:

a receiving step that receives a route control message which includes information required for determining a route on the network;

a route computing step that determines the route on the network based on the received route control message;

a sending step that sends a node apparatus a route control message which includes information required for said node apparatus to determine a route on the network;

a delay computing step wherein when receiving the route control message, the delay computing step computes an operation start time for the determination of the route on the network and the sending of the route control message, based on a distance between a topology change part and a node apparatus of oneself; and an execution control step that controls the execution of the route determination and the route control message sending, based on the computed operation start time.

In order to solve the above-described problem, the present invention also provides a route computation system which operates in an autonomous system, and includes a node apparatus and a damaged part estimating apparatus which are connected via an internal network within the autonomous system, wherein:

when a topology change occurs on a network used for packet transfer between node apparatuses, the route computation system performs dynamic route control for establishing a new normal route;

the damaged part estimating apparatus comprises:
a damaged part estimating device that estimates a topology change part; and
a damaged part communicating devise that communicates the topology change part estimated by the damaged part estimating device to the node apparatus; and
the node apparatus comprises:
a message receiving device that receives, from another node apparatus, a route control message which includes information required for determining a route on the network;
a damaged part receiving device that receives the topology change part from the damaged part estimating apparatus;
a route computing device that determines the route based on the received route control message;
a message sending device that sends another node apparatus a route control message which includes information required for said another node apparatus to determine a route on the network;
a delay computing device wherein when receiving the route control message by the message receiving device, the delay computing device computes an operation start time for route control operation executed by the route computing device and the message sending device, based on a distance between the node apparatus of oneself and the topology change part received by the damaged part receiving device; and
an execution control device that controls the execution of the route control operation by the route computing device and the message sending device, based on the operation start time computed by the delay computing device.

In order to solve the above-described problem, the present invention also provides a route computation system which operates in an autonomous system, and includes a node apparatus and a distance estimating apparatus which are connected via an internal network within the autonomous system, wherein:

when a topology change occurs on a network used for packet transfer between node apparatuses, the route computation system performs dynamic route control for establishing a new normal route;

the distance estimating apparatus comprises:
a distance estimating device that estimates a distance between the node apparatus and a topology change part; and
a distance communicating devise that communicates the distance estimated by the distance estimating device to the node apparatus; and
the node apparatus comprises:
a message receiving device that receives, from another node apparatus, a route control message which includes information required for determining a route on the network;
a distance receiving device that receives, from the distance estimating apparatus, the distance up to the topology change part;
a route computing device that determines the route on the network based on the received route control message;
a message sending device that sends another node apparatus a route control message which includes information required for said another node apparatus to determine a route on the network;
a delay computing device wherein when receiving the route control message by the message receiving device, the delay computing device computes an operation start time for route control operation executed by the route computing device and the message sending device, based on the distance up to the topology change part, which was received by the distance receiving device; and
an execution control device that controls the execution of the route control operation by the route computing device and the message sending device, based on the operation start time computed by the delay computing device.

In order to solve the above-described problem, the present invention also provides a route computation apparatus connected to at least one node apparatus among node apparatuses wherein when a topology change occurs on a network used for packet transfer, the route computation apparatus performs dynamic route control for establishing a new normal route, and the route computation apparatus comprises:

a message receiving device that receives, from said at least one node apparatus, a route control message which includes information required for determining a route on the network;

a route computing device that determines the route on the network based on the received route control message;

a message sending device that sends another node apparatus via said at least one node apparatus, a route control message which includes information required for said another node apparatus to determine a route on the network;

a delay computing device wherein when receiving the route control message by the message receiving device, the delay computing device computes an operation start time for route control operation executed by the route computing device and the message sending device, based on a distance between a topology change part and said at least one node apparatus; and an execution control device that controls the execution of the route control operation by the route computing device and the message sending device, based on the operation start time computed by the delay computing device.

Effect of the Invention

In accordance with the present invention, when a change in topology occurs on the network, it is possible to shorten the service stop time without damaging the stability of the network.

MODE FOR CARRYING OUT THE INVENTION

Below, embodiments of the present invention will be explained with reference to the drawings.

A. First Embodiment

A first embodiment of the present invention will be explained first.

Figure 1:
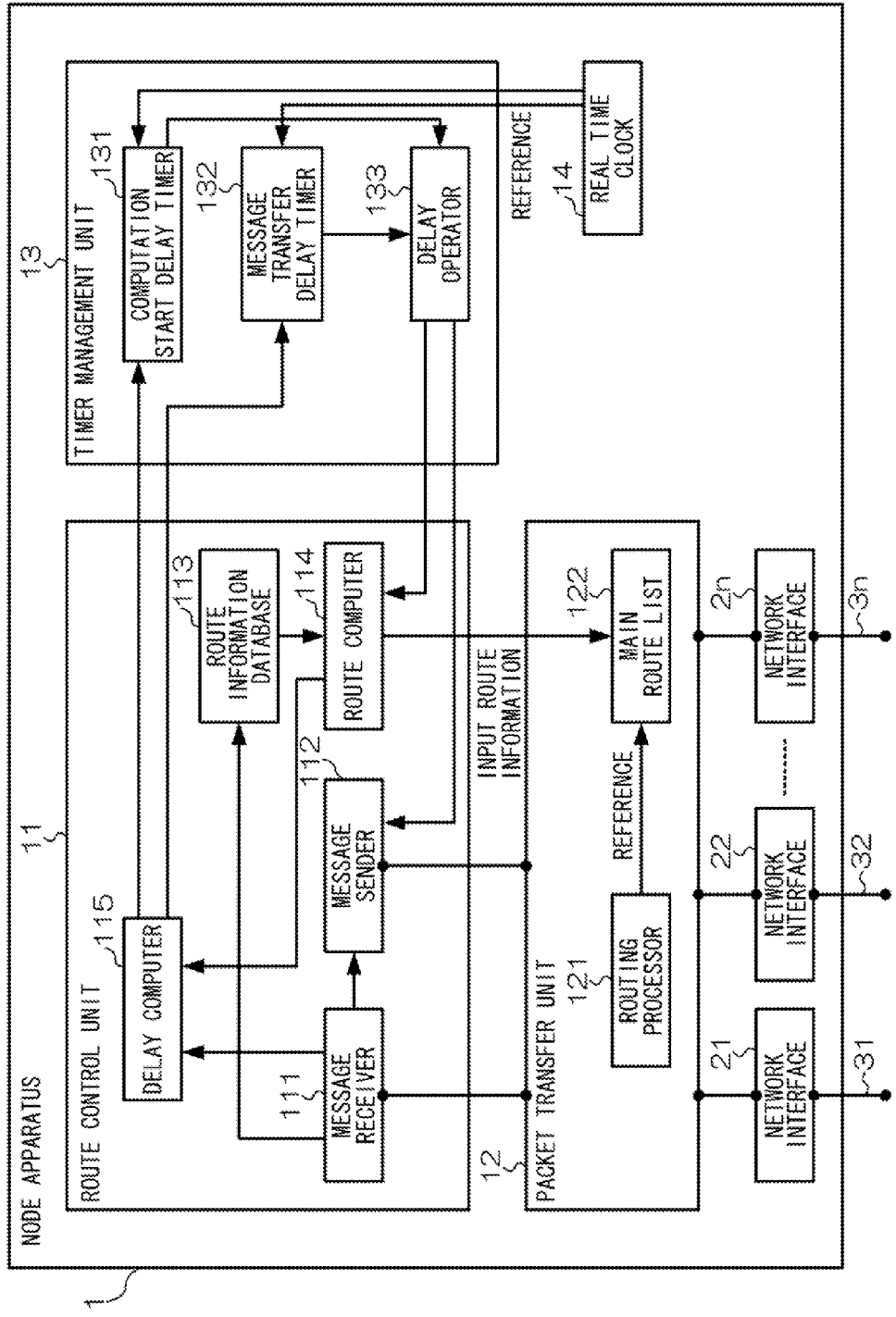
FIG. 1 is a block diagram showing the structure of a node apparatus of the first embodiment of the present invention.

FIG. 1 is a block diagram showing the structure of the node apparatus of the first embodiment of the present invention.

In the figure, a node apparatus 1 includes a route control unit 11 for performing exchange of route information or the like between the node apparatus 1 and another node apparatus; a packet transfer unit 12 for transferring each packet based on information in a route list prepared by the route control unit 11; a timer management unit 13 for managing each timer used by the route control unit 11; a real time clock 14 for securing the present time; and network interfaces 21 to 2n for connecting to external networks 31 to 3n.

The route control unit 11 includes a message receiver 111 for receiving a message for a route control protocol from another node apparatus; a message sender 112 for sending a message for the route control protocol to another node apparatus when receiving an operation instruction from a delay operator 133; a route information database 113 for storing route information obtained from another node apparatus via the message receiver 111; a route computer 114 for performing a route computation using the route information stored in the route information database 113 when receiving an operation instruction from the delay operator 133; and a delay computer 115. When the message receiver 111 receives a message, the delay computer 115 computes a time from the message reception to the start of the route computation and a time from the message reception to the transfer of the message to an adjacent node apparatus, by using a topology change part communicated by the message.

The packet transfer unit 12 includes a routing processor 121 for performing an operation of transferring each packet received via the network interfaces 21 to 2n; and a main route list 122 having a table for determining the addressee and the network interface to be used for the next transfer, based on the addressee of the relevant packet.

The timer management unit 13 includes a computation start delay timer 131 for measuring a time $t_c$, (i.e., timer value $t_c$) from the message reception to the start of the route computation; a message transfer delay timer 132 for measuring a time $t_t$ (i.e., timer value $t_t$) from the message reception to the transfer of the received message to an adjacent node apparatus; and the delay operator 133. When receiving a notification indicating that the time corresponding to the timer value $t_c$ or $t_t$, set in the computation start delay timer 131 or the message transfer delay timer 132, has elapsed, the delay operator 133 issues an operation start instruction to the route computer 114 (for $t_c$) or the message sender 112 (for $t_t$).

In the first embodiment, the route control unit 11, the timer management unit 13, and the real time clock 14 are provided in the node apparatus 1. However, they may be provided in an apparatus separate from the node apparatus 1.

For example, a server apparatus separate from the node apparatus may be provided, and the route control unit 11, the timer management unit 13, and the real time clock 14 may be contained in the server apparatus.

The node apparatus 1 and the server apparatus may be directly connected via a dedicated cable, or may be connected via any one of the networks 31, 32, ..., 3n connected to the node apparatus 1.

Next, the operation of the first embodiment will be explained.

Figure 2:
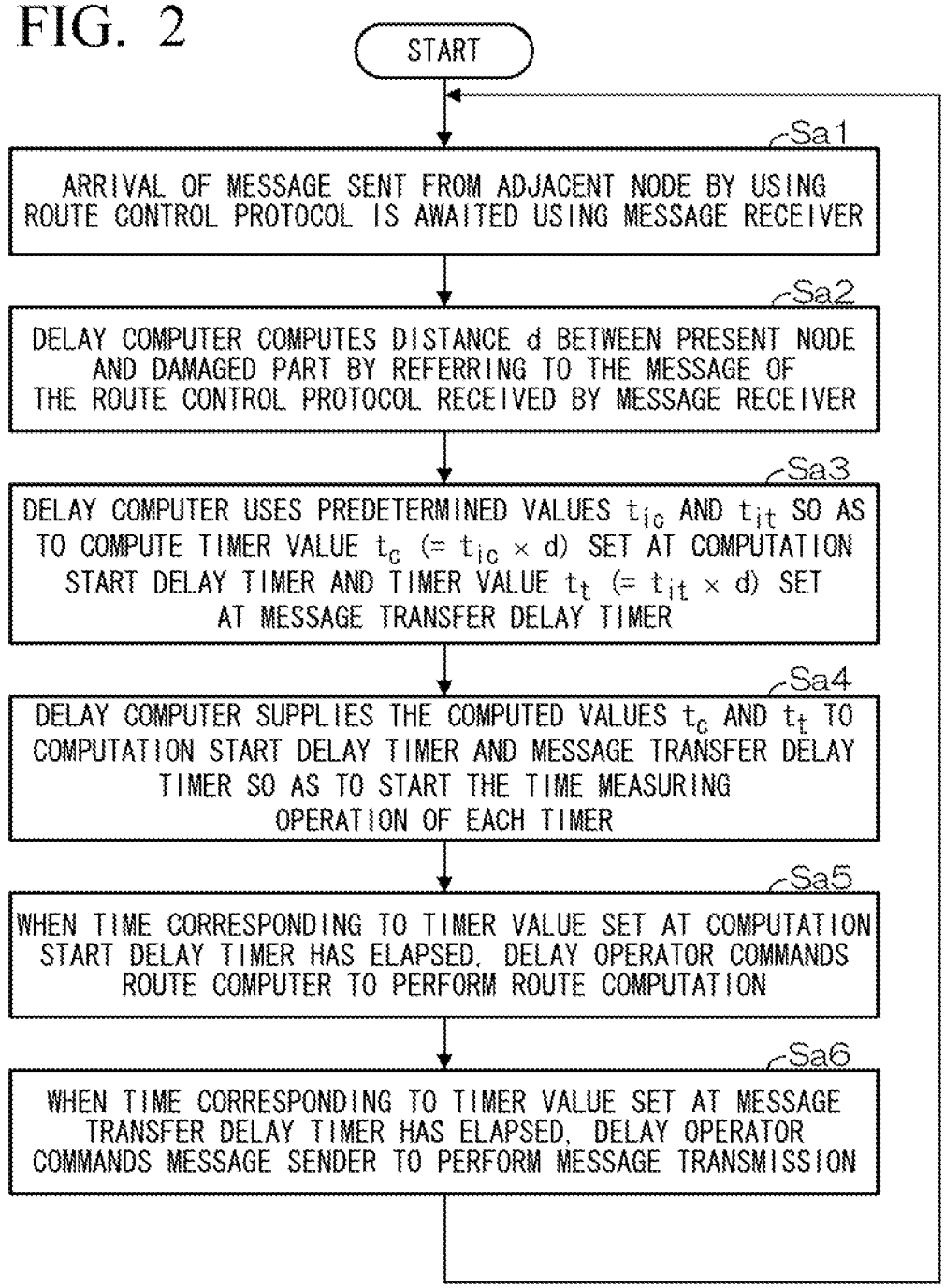
FIG. 2 is a flowchart for explaining a message receiving operation using a route control protocol in the node apparatus of the first embodiment.

FIG. 2 is a flowchart for explaining a message receiving operation using a route control protocol in the node apparatus 1 of the first embodiment.

A message using the route control protocol is not only communicated when a topology change occurs due to a failure in a node apparatus or a link as a constituent of the relevant network, but also used for monitoring an adjacent node apparatus.

The above message using the route control protocol indicates a message for communicating a topology change, and the following explanation relates to the operation performed when receiving such a message.

First, arrival of a message sent from an adjacent node by using the route control protocol is awaited using the message receiver 111 (see step Sa1).

Next, the delay computer 115 computes a distance d between the present node and a damaged part by referring to the message of the route control protocol, which is received by the message receiver 111 (see step Sa2). The distance d is represented by the number (called "hop number") of the nodes which are present on the shortest path from the present node to the damaged part (at which the topology is changed).

The delay computer 115 uses values $t_{ic}$ and $t_{it}$, which are predetermined by specific setting, so as to compute the timer value $t_c$ ($=t_{ic} \times d$) set at the computation start delay timer 131 and the timer value $t_t$ ($=t_{it} \times d$) set at the message transfer delay timer 132 (see step Sa3).

Next, the delay computer 115 supplies the computed timer values $t_c$ and $t_r$ to the computation start delay timer 131 and the message transfer delay timer 132 so as to start the time measuring operation of each timer (see step Sa4).

When the time corresponding to the timer value $t_c$ set at the computation start delay timer 131 has elapsed, the delay operator 133 commands the route computer 114 to perform the route computation (see step Sa5).

Additionally, when the time corresponding to the timer value $t_r$ set at the message transfer delay timer 132 has elapsed, the delay operator 133 commands the message sender 112 to perform the message transmission (see step Sa6).

The order for the execution of steps Sa5 and Sa6 may be exchanged in accordance with the set timer values $t_c$ and $t_r$.

When the entire operation is completed, the operation returns to step Sa1, and the above-described steps are repeatedly executed.

In step Sa3, the timer values $t_c$ and $t_r$ are computed so that they are each in proportion to the distance d. However, it is not an absolute condition. The timer values $t_c$ and $t_r$ may each be in proportion to the square of the distance d, or the distance d may be computed using a function whose variable is the distance d.

Another computation method will be shown. The timer values $t_c$ and $t_r$ computed as described above are respectively compared predetermined upper limit values $t_{cmax}$ and $t_{tmax}$. If the latter (upper limit) is smaller, the upper limit ($t_{cmax}$ or $t_{tmax}$) is used as the corresponding timer value ($t_c$ or $t_r$). That is, the upper limits $t_{cmax}$ and $t_{tmax}$ are predetermined so as to pretend the timer values $t_c$ and $t_r$ from being too great.

Such upper limit setting may be applied, not only to the timer values $t_c$ and $t_r$, but also to the distance d. For example, if the distance d used for a target computation is greater than a predetermined upper limit $d_{max}$, the upper limit $d_{max}$ is preferably used instead of the distance d, so as to compute the timer values $t_c$ and $t_r$.

In addition, the timer values $t_c$ and $t_r$ may be computed as follows.

The timer values $t_c$ and $t_r$ computed by the delay computer 115 are respectively compared with values which are predetermined by specific setting. If the former values are greater, the timer values $t_c$ and $t_r$ are set to be infinite.

Setting the timer values $t_c$ and $t_r$ to be infinite means that the computation start delay timer 131 and the message transfer delay timer 132 are not to be operated, and that the route computation by the route computer 114 and the retransfer by the message sender 112 are not to be executed.

In such a case, although the route computation or the like is not performed, updated data (i.e., route information) communicated by the currently received route control message is effective in the route information database 113. After that, when another route control message is received and the timer values $t_c$ and $t_r$ computed by the delay computer 115 are not infinite, the route computation is performed while considering the previously updated data. Also in the corresponding message transmission, the route control message which was not sent in the previous transmission is sent simultaneously.

A similar operation can be performed for the upper limit $d_{max}$ for the distance d. If the distance d used for a target computation exceeds the upper limit $d_{max}$, the timer values $t_c$ and $t_r$ are treated as infinite values.

In addition, the computation method may be switched in accordance with whether the distance d used for a target computation exceeds a predetermined threshold $d_{th}$.

For example, when the distance d does not exceed the predetermined threshold $d_{th}$, the timer values $t_c$ and $t_r$, each being proportional to the distance d, are used, and otherwise, the timer values, each being proportional to the square of the distance d, are used.

Instead of such a single threshold, a plurality of thresholds may be used. For example, two thresholds $d_{th1}$, and $d_{th2}$ ($d_{th1} < d_{th2}$) may be used, and different methods may be assigned to the following three conditions for the distance d.

$$d < d_{th1} \quad (1)$$

$$d_{th1} \leq d < d_{th2} \quad (2)$$

$$d_{th2} \leq d \quad (3)$$

Instead of employing the hop number, the distance d used in step Sa3 may be represented by the sum of the cost values for the path between two nodes, that is, the sum of the cost values assigned to each node and each link between the relevant nodes.

In the OSPF protocol, the cost value is assigned only to each link, and not assigned to each node. In such a case, the sum of the cost values of each link on the path may be used as the total cost value for the path.

On the contrary, if the cost value is assigned only to each node and not assigned to each link, the sum of the cost values of each node on the path may be used as the total cost value for the path.

Next, the process for computing the distance d in step Sa2 will be explained in more detail.

In this process of the first embodiment, the route computer 114 in FIG. 1 uses information for a tree structure generated during the route computation for ordinary OSPF. Therefore, the route computation for OSPF and information used therefor will be explained first.

Figure 3:
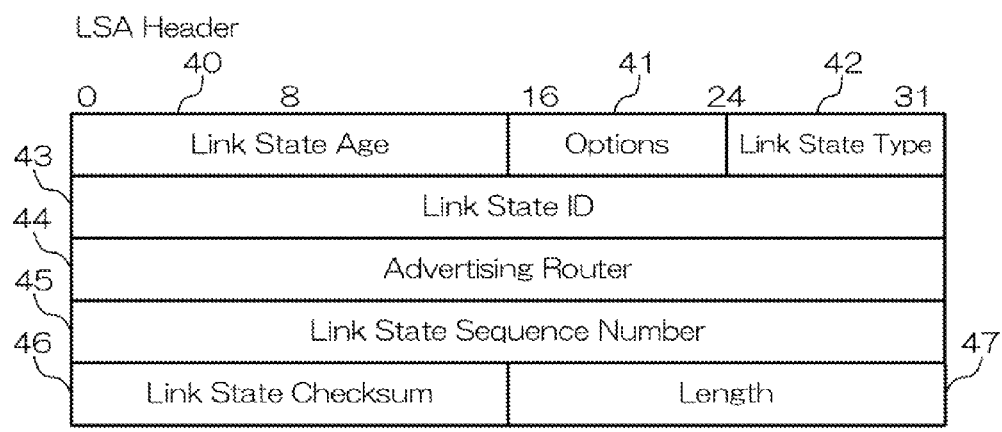
FIG. 3 is a schematic diagram showing the structure of each field of LSA header for an OSPF message.
Figure 4:
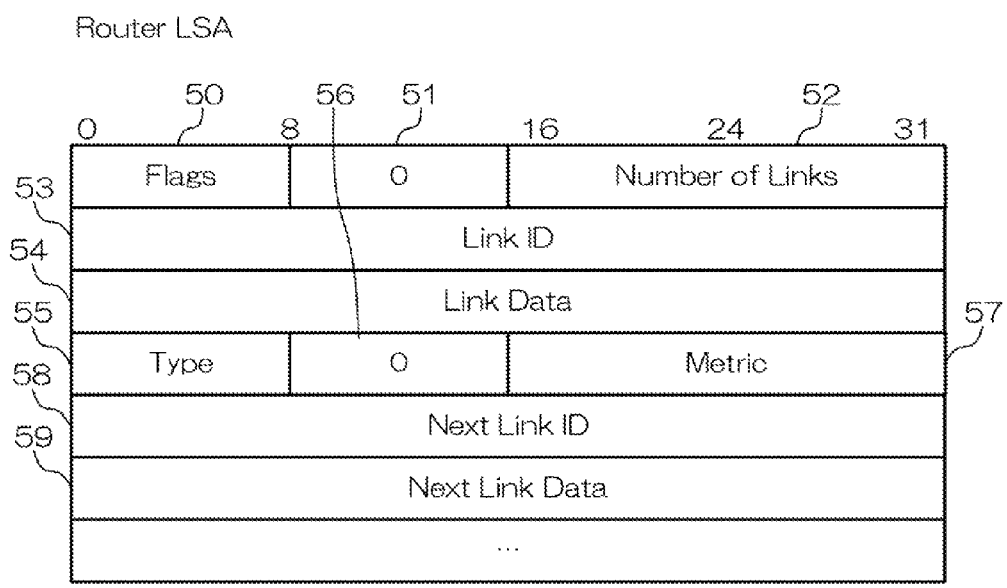
FIG. 4 is a schematic diagram showing the structure of each field of Router LSA for an OSPF message.
Figure 5:
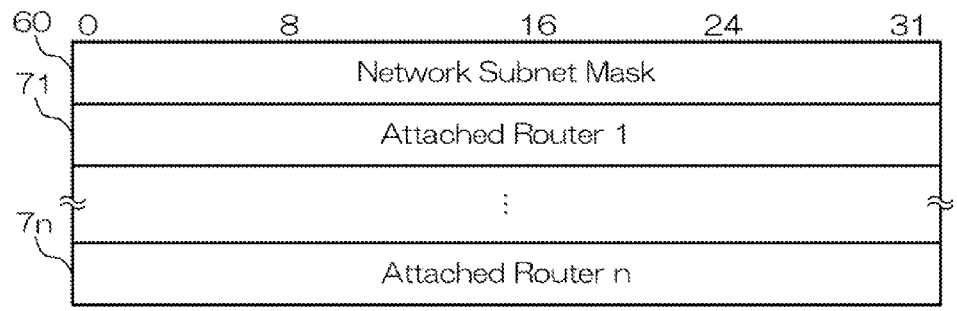
FIG. 5 is a schematic diagram showing the structure of each field of Network LSA for an OSPF message.

Between the nodes within a network operated based on OSPF, information exchange is performed using a unit called "LSA (link state advertisement)" for the route computation. FIGS. 3 to 5 are schematic diagrams showing popular packet formats for LSA.

FIG. 3 shows a format of a part which is called "LSA header" in an OSPF message, and is commonly used regardless of the type of LSA.

FIG. 4 shows a packet format of "Router LSA" for an OSPF message. This part is located immediately after LSA header shown in FIG. 3.

For Router LSA, a value 1 for indicating that the present LSA is a Router LSA is stored in a field 42 (see "Link State Type") in FIG. 3.

In a field 43 (see "Link State ID") of FIG. 3, an individual number (called "Router ID") assigned to each node apparatus (i.e., router) is stored.

As shown in FIG. 4, in the part located immediately after LSA header, fields 53 to 57 form a group, where information about a link connected to the relevant node apparatus is stored.

When a plurality of links are connected to the node apparatus, similar information is stored in fields from a field 58 and after.

As described above, Router LSA indicates which link the relevant node apparatus (i.e., router) is connected to.

Next, FIG. 5 shows a packet format of "Network LSA" for an OSPF message. This part is also located immediately after LSA header shown in FIG. 3.

For Network LSA, a value 2 for indicating that the present LSA is a Network LSA is stored in the field 42 (see "Link. State Type") in FIG. 3.

In the field 43 (see "Link State ID") of FIG. 3, an ID (called "Router ID") for identifying a representative node apparatus (i.e., router) among the node apparatuses (routers) connected to the relevant link, which is called a "designated router", is stored.

In fields 71 to 7n (see "Attached Router 1 to Attached Router n") of FIG. 5, Router IDs of the node apparatuses connected to the present link are stored.

As described above, Network LSA indicates whether a target router is connected to the present link.

The route computation of OSPF uses topology information obtained by joining the collected information items about Router LSA and Network LSA together. A Dijkstra's algorithm used for solving a shortest path problem is applied to the topology information so as to determine the shortest path.

Figure 6:
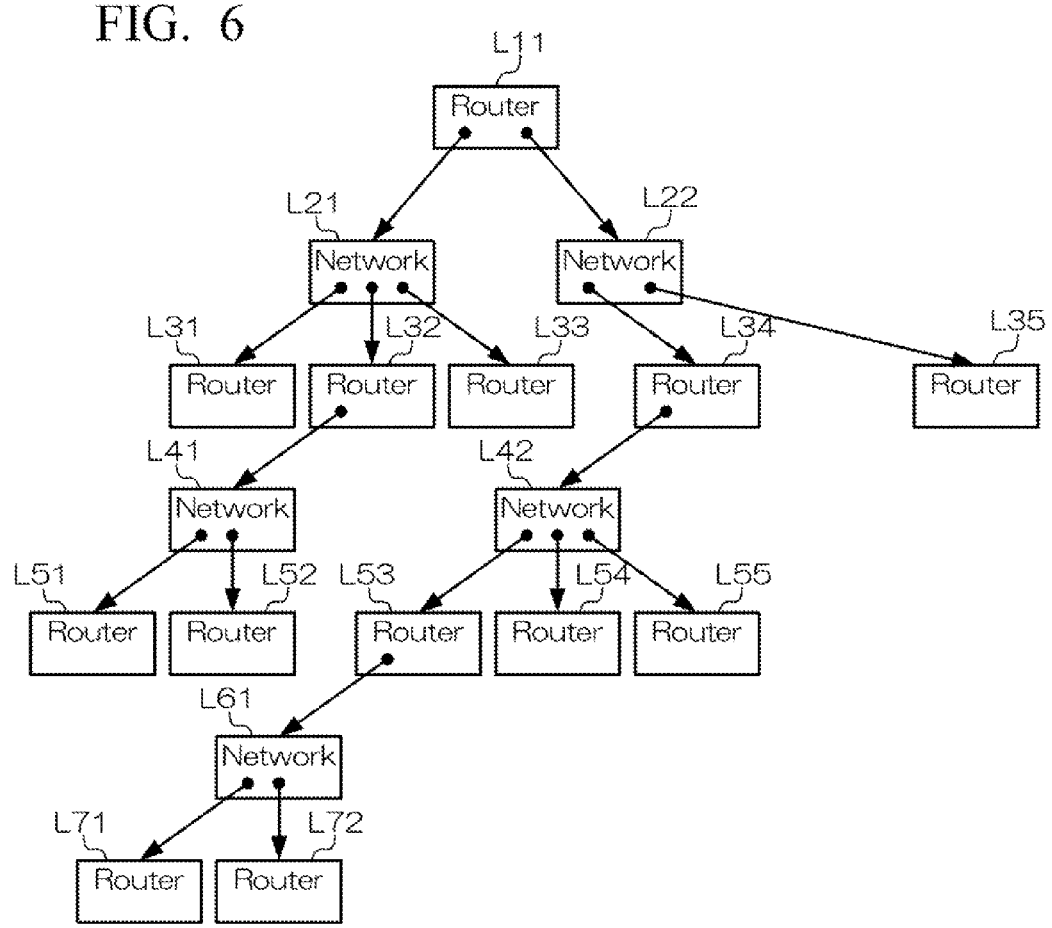
FIG. 6 is a schematic diagram showing a tree structure obtainable in the route computation of the first embodiment.

FIG. 6 is a schematic diagram showing a tree structure obtainable in the route computation of the first embodiment.

In the relevant computation, information having a tree structure as shown in FIG. 6 can be obtained, where Router LSA indicating oneself is located at the head (L11) of the tree.

In the first embodiment, the information having such a tree structure is used for computing the distance d from the damaged part to the node apparatus 1.

Figure 7:
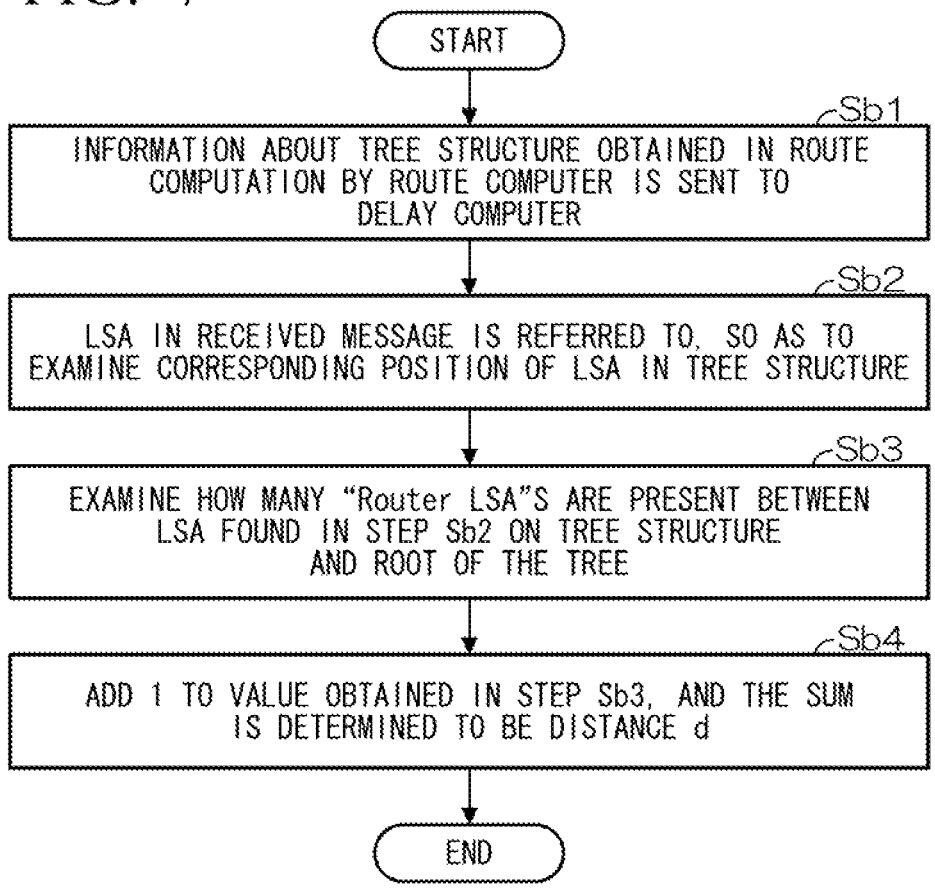
FIG. 7 is a flowchart explaining the procedure for measuring the distance up to a damaged part based on OSPF in the first embodiment.

FIG. 7 is a flowchart explaining the procedure for measuring the distance d up to a damaged part based on OSPF in the first embodiment.

First, information about a tree structure obtained in the route computation performed by the route computer 114 is sent to the delay computer 115 (see step Sb1). This step indicates that information about a tree structure obtained in the route computation performed immediately before is used to determine the tinier values $t_c$ and $t_t$ used for the next route computation and message transmission.

Next, LSA in the received message is referred to, so as to examine the corresponding position of the relevant LSA in the tree structure (see step Sb2).

The next step examines how many Router LSAs are present between the LSA found in step Sb2 on the tree structure and the root of the tree (see step Sb3).

The value obtained in step Sb3 is added to 1, and the sum is determined to be the distance d (see step Sb4).

In an example case which will be explained below, a failure has occurred between Router (LSA) L53 and Network (LSA) L61 connected thereto.

In such a case, since the node apparatus represented by Router (LSA) L53 has no connection with a link represented by Network (LSA) L61, Router (LSA) L53 is updated and relevant information is communicated to each node apparatus.

When a node apparatus which manages the information about the tree structure shown in FIG. 6 receives the communicated information, the node apparatus examines the number of Route (LSA)s present between Router (LSA) L53 and Network (LSA) L11.

Since only Router (LSA) L34 satisfies the above condition, the value 1 is added to 1, so that the distance "2" is obtained.

Although OSPF as a route control protocol of IPv4 is employed in the first embodiment, operation on a similar method can be applied to route control of IPv6.

In accordance with the above-described first embodiment, a timer value depending on the distance from a damaged part to the present node apparatus is supplied to a timer used for preventing an increase in the relevant load. Therefore, a relatively small timer value is applied to a node apparatus close to the damaged part, thereby reducing the service stop time. In addition, since a relatively large timer value is applied to a node apparatus far away from the damaged part, it is possible to prevent the load for the route computation from increasing temporarily, and to improve the stability of the network.

In the above method, the load for the route computation of a node apparatus close to the damaged part may be larger than that for conventional methods. However, an average load for the route computation in the entire network can be reduced.

B. Second Embodiment

Next, a second embodiment of the present invention will be explained.

Figure 8:
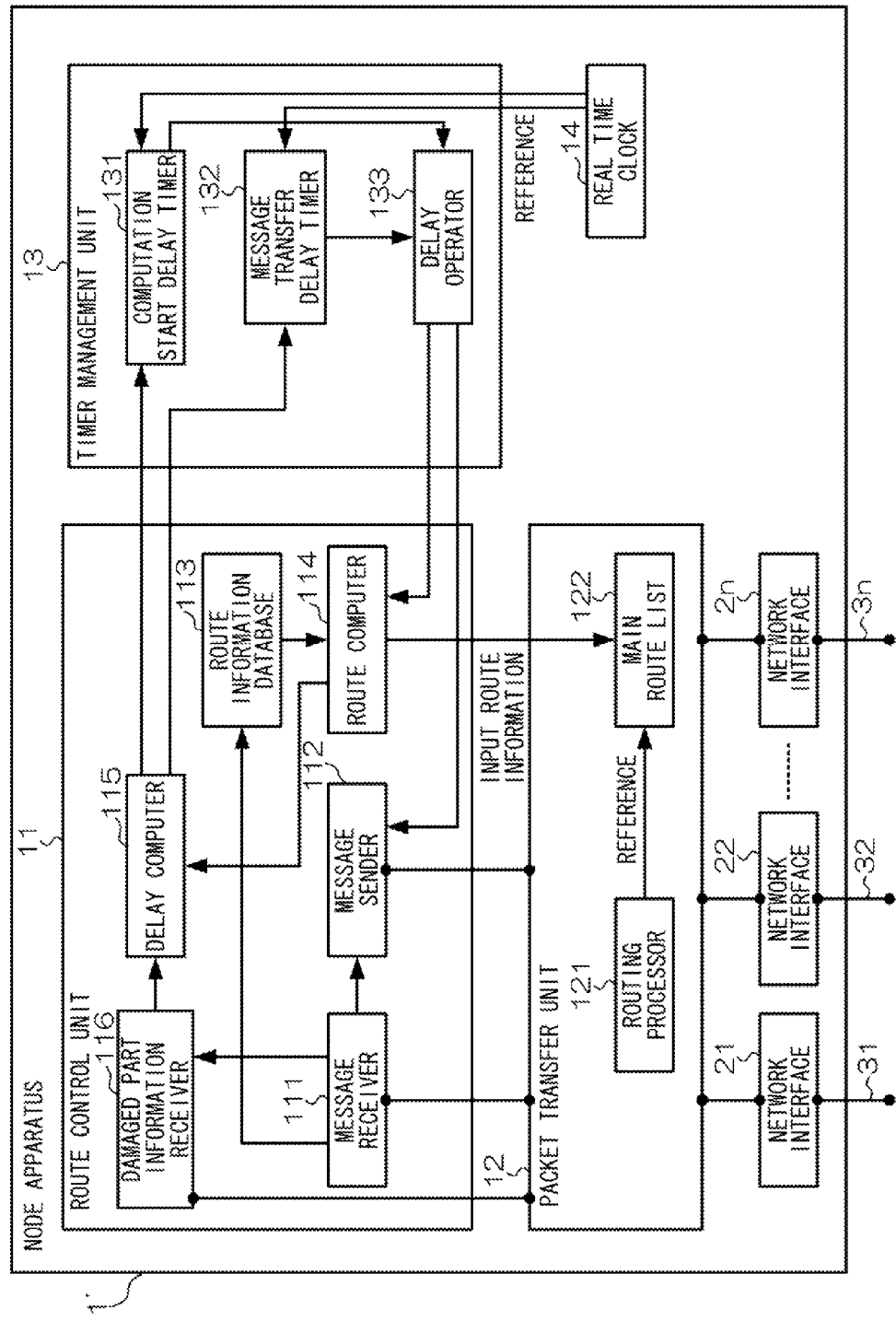
FIG. 8 is a block diagram showing the structure of a node apparatus of the second embodiment of the present invention.

FIG. 8 is a block diagram showing the structure of a node apparatus of the second embodiment of the present invention.

In the figure, in comparison with the structure (see FIG. 1) of the first embodiment, the second embodiment has a distinctive feature of having a damaged part information receiver 116.

In a path-vector route control protocol such as BGP, a prefix is communicated together with an AS (autonomous system) path. When a link failure or the like occurs, a substitute route is communicated together with a new path. However, the damaged part cannot be detected only based on the communicated information.

Here, a technique for estimating a damaged part based on some kind of information has been examined and developed, as shown in Reference Document 1 (Atsuo Tachibana, Shigehiro Ano, and Masato Tsuru, "A proposal of Locating BGP Routing Failures based on Simulation Analysis", Meeting of IEICE Communications Society, B-16-6, p. 134, 2008).

Accordingly, a node apparatus 1' in the second embodiment receives, by means of the damaged part information receiver 116, a notification indicating information about a damaged part estimated by a damaged part estimating system explained below. The timer values $t_c$ and $t_t$ are determined based on the received information.

Figure 9:
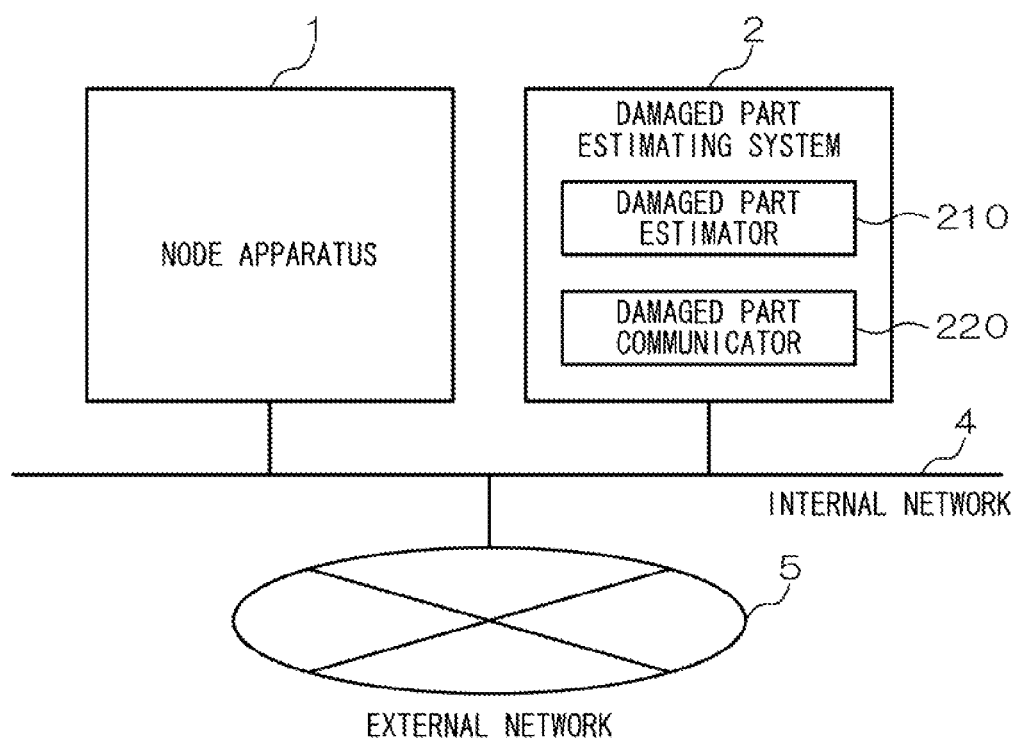
FIG. 9 is a block diagram showing an example structure of the node apparatus 1' and a damaged part estimating system 2 in the second embodiment.

FIG. 9 is a block diagram showing an example structure of the node apparatus 1' and a damaged part estimating system 2 in the second embodiment.

In FIG. 9, the node apparatus 1' and the damaged part estimating system 2 are connected via an internal network 4 within an autonomous system, where each operation between the node apparatus 1' and the damaged part estimating system 2 is performed within the autonomous system. The damaged part estimating system 2 is also connected to an external network 5 via the internal network 4 or the node apparatus 1'.

The damaged part estimating system 2 in FIG. 9 has a damaged part estimator 210 for estimating a damaged part, and a damaged part communicator 220 for communicating the damaged part estimated by the damaged part estimator to the node apparatus 1'.

Figure 10:
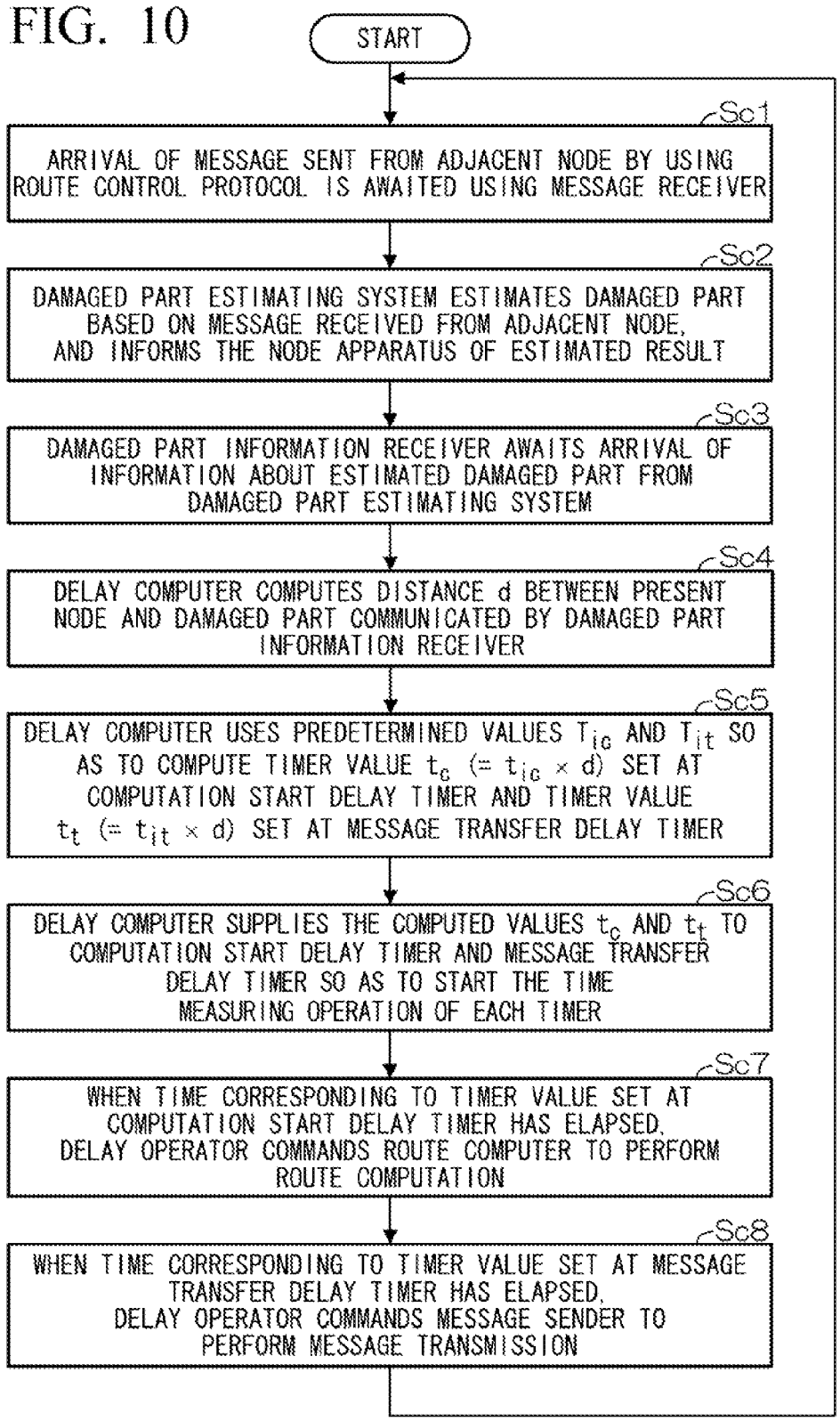
FIG. 10 is a flowchart explaining the message receiving operation based on the route control protocol in the second embodiment.

FIG. 10 is a flowchart explaining the message receiving operation based on the route control protocol in the second embodiment.

In FIG. 10, steps Sc1, Sc5, Sc6, Sc7, and Sc8 are identical to Sa1, Sa3, Sa4, Sa5, and Sa6 in FIG. 2 for the operation of the above-described first embodiment, and new steps Sc2 and Sc3 are inserted between steps Sc1 to Sc4 while the operation in step Sc4 (corresponding to step Sa2 in FIG. 2) is partially modified.

In step Sc2, the damaged part estimating system 2 estimates a damaged part based on a message received from an adjacent node, and informs the node apparatus 1' of the estimated result.

In the next step Sc3, the damaged part information receiver 116 of the node apparatus 1' awaits arrival of information about the estimated damaged part from the damaged part estimating system 2.

In the next step Sc4, the delay computer 115 computes distance d between the present node and the damaged part communicated by the damaged part information receiver 116.

Instead of employing the hop number of nodes as the distance d in the first embodiment, the distance d used in the second embodiment may be represented by the number of AS paths on the relevant route.

In the second embodiment, the damaged part is estimated using the damaged part estimating system 2 which is an external system. The distance up to the damaged part may be computed using an external system. In such a case, the node apparatus 1' of the second embodiment may receive a distance d from the external system to the damaged part, and compute the timer values $t_c$ and $t_t$ used for the route control, based on the received distance d In accordance with the above-described second embodiment, a damaged part or a distance up to the damaged part is estimated using the distance damaged part estimating system 2 which is an external system, and the node apparatus 1' computes the timer values $t_c$ and $t_t$ used for the route control, based on the damaged part or the distance up to the damaged part received from the distance damaged part estimating system 2. Therefore, the load relating to the route control can be further reduced, thereby further improving the stability of the network.

C. Third Embodiment

Next, a third embodiment of the present invention will be explained.

Figure 11:
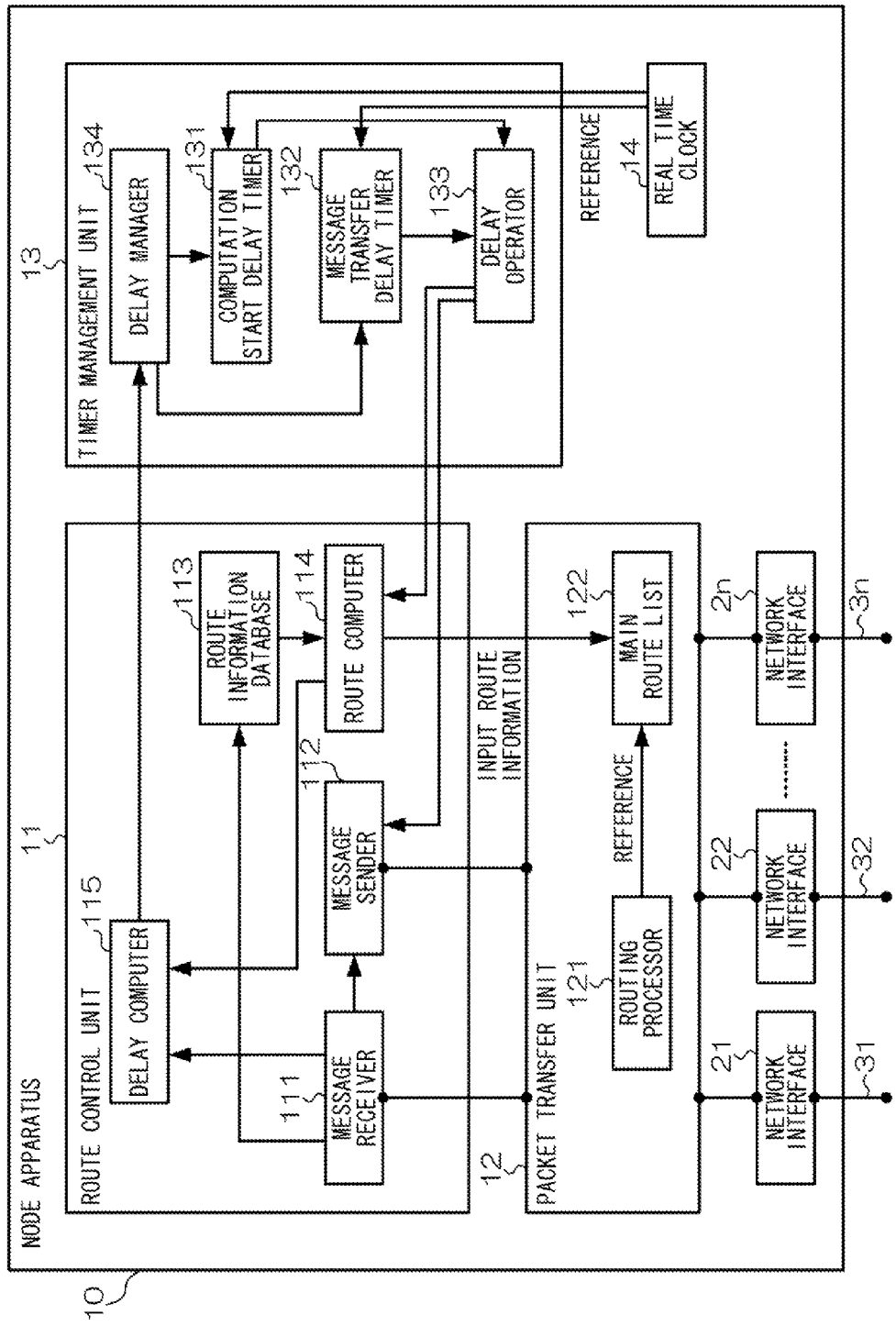
FIG. 11 is a block diagram showing the structure of a node apparatus 10 of the third embodiment of the present invention.

FIG. 11 is a block diagram showing the structure of a node apparatus 10 of the third embodiment of the present invention.

In the figure, in comparison with the structure (see FIG. 1) of the first embodiment, the third embodiment has a delay manager 134.

In the third embodiment, during the operation of the computation start delay timer 131 or the message transfer delay timer 132, an additional step relating to the message reception by the route control protocol is performed.

Similar to the above-described first embodiment, the delay computer 115 determines the timer value k up to the start of the route computation and the timer value $t_t$ up to the start of the message retransfer, and sends the timer values to the delay manager 134.

The delay manager 134 compares the timer value $t_c$ up to the start of the route computation (sent from the delay computer 115) with the current value at the computation start delay timer 131.

If the timer value $t_c$ up to the start of the route computation is smaller, the computation start delay timer 131 is updated using the timer value $t_c$.

Similarly, the delay manager 134 compares the tinier value $t_t$ up to the start of the message retransfer (sent from the delay computer 115) with the current value at the message transfer delay timer 132. If the timer value $t_t$ is smaller, the message transfer delay timer 132 is updated using the tinier value $t_t$.

In accordance with the above-described third embodiment, a case in which a change in the network topology occurs at a plurality of parts can also be handled.

D. Fourth Embodiment

Next, a fourth embodiment of the present invention will be explained.

Figure 12:
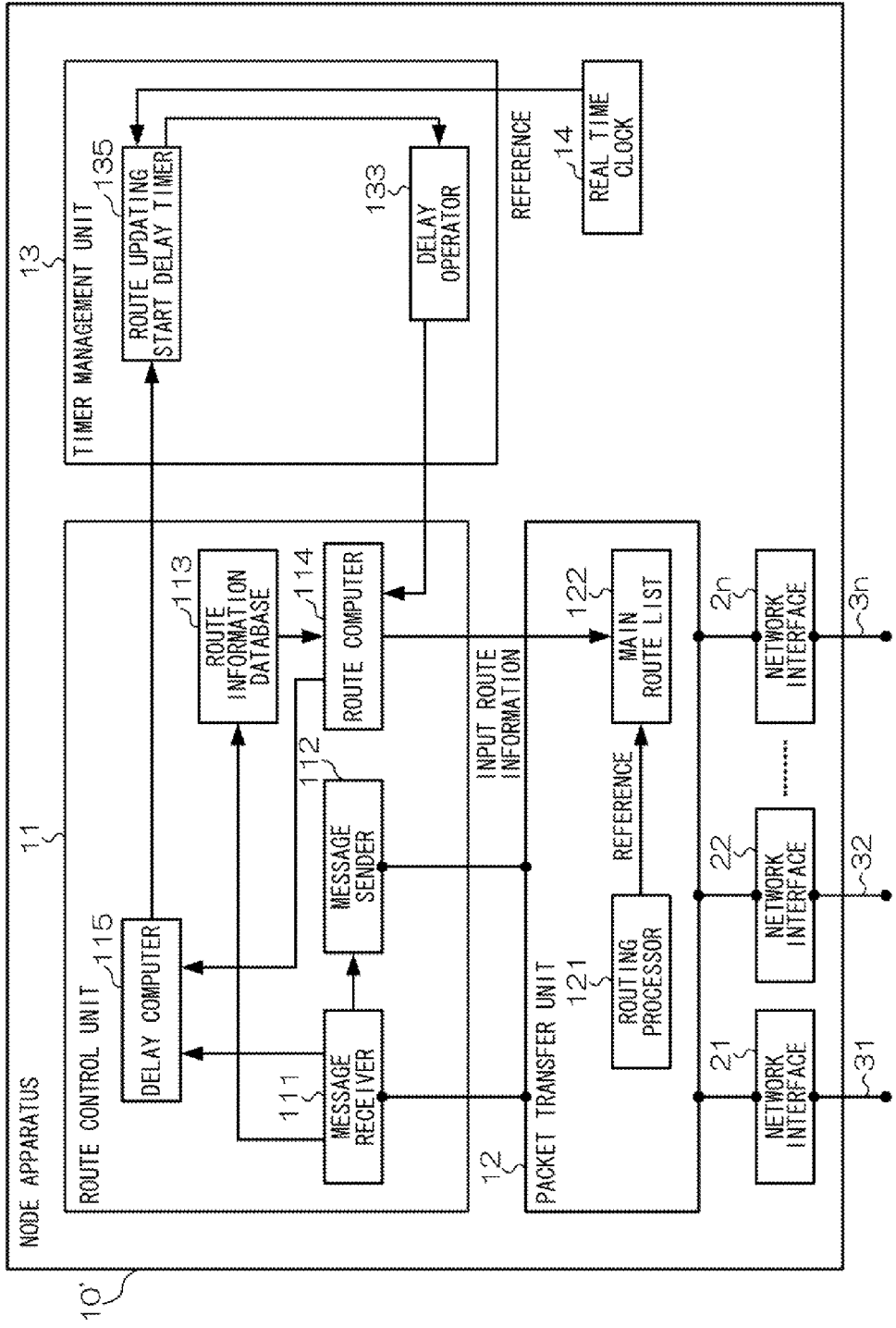
FIG. 12 is a block diagram showing the structure of a node apparatus 10' of the fourth embodiment of the present invention.

FIG. 12 is a block diagram showing the structure of a node apparatus 10' of the fourth embodiment of the present invention.

In the figure, in comparison with the structure (see FIG. 1) of the first embodiment, the fourth embodiment has a route updating start delay timer 135 in place of the computation start delay timer 131 and the message transfer delay timer 132.

In the fourth embodiment, the delay computer 115 computes a timer value $t_r$ up to the start of route updating by using a method similar to that of the first embodiment, and supplies the computed value to the route updating start delay timer 135.

When the timer value $t_r$ is set at the route updating start delay timer 135, the timer 315 starts countdown operation, which continues until the timer value $t_r$ decreases to zero.

When the value of the route updating start delay timer 135315 becomes zero, the delay operator 133 commands the route computer 114 to start updating the main route list 122 by using the route obtained by the route computation.

In accordance with the fourth embodiment, degradation in stability of the network due to instability in the operation of the packet transfer unit 12 during the updating of the relevant route list can be spatially and temporally distributed by delaying the updating itself of the main route list 122, thereby further improving the stability of the network.

INDUSTRIAL APPLICABILITY

As a specifically anticipated example of an application of the present invention, the present invention can be applied to a high availability router on a carrier's IP backbone network.

Reference Symbols 1, 1', 10, 10' node apparatus
11 route control unit
12 packet transfer unit
13 timer management unit
14 real time clock
21 to 2n network interface
31 to 3n external network
111 message receiver
112 message sender
113 route information database
114 route computer
115 delay computer
116 damaged part information receiver
121 routing processor
122 main route list
131 computation start delay timer
132 message transfer delay timer
133 delay operator
134 delay manager
135 route updating start delay timer
2 damaged part estimating system
210 damaged part estimator
220 damaged part communicator
4 internal network
5 external network

The invention claimed is:

1. A node apparatus wherein when a topology change occurs on a network used for packet transfer between node apparatuses, said node apparatus performs dynamic route control for establishing a new normal route, and said node apparatus comprises:

a message receiving device that receives, from another node apparatus, a route control message which includes information required for route determination;

a route computing device that determines a route on the network based on the received route control message;

a message sending device that sends another node apparatus a route control message which includes information required for said another node apparatus to determine a route on the network;

a delay computing device wherein when receiving the route control message by the message receiving device, the delay computing device computes an operation start time for route control operation executed by the route computing device and the message sending device, based on a distance between a topology change part and said node apparatus of oneself; and an execution control device that controls the execution of the route control operation by the route computing device and the message sending device, based on the operation start time computed by the delay computing device.

2. The node apparatus in accordance with claim 1, wherein:
the execution control device has a computation start delay timer device that measures a time up to the start of the route computation by the route computing device, based on the operation start time computed by the delay computing device.

3. The node apparatus in accordance with claim 2, wherein:
the execution control device has a delay operation device; and
when the time measured by the computation start delay timer device reaches the operation start time, the delay operation device commands the route computing device to start the route computation.

4. The node apparatus in accordance with claim 1, wherein:
the execution control device has a message transfer delay timer device that measures a time up to the start of the route control message sending by the message sending device, based on the operation start time computed by the delay computing device.

5. The node apparatus in accordance with claim 4, wherein:
the execution control device has a delay operation device; and
when the time measured by the message transfer delay timer device reaches the operation start time, the delay operation device commands the message sending device to start the route control message sending.

6. The node apparatus in accordance with claim 1, wherein:
the delay computing device uses the hop number, which is the number of nodes present between the topology change part and said node apparatus of oneself, as the distance used for computing the operation start time.

7. The node apparatus in accordance with claim 1, wherein:
the delay computing device uses the sum of costs for a path between the topology change part and said node apparatus of oneself, as the distance used for computing the operation start time.

8. The node apparatus in accordance with claim 1, wherein:
the delay computing device uses the number of autonomous systems present between the topology change part and said node apparatus of oneself, as the distance used for computing the operation start time.

9. The node apparatus in accordance with claim 1, wherein:
the delay computing device uses a shortest path tree generated during the route computation by the route computing device, so as to determine the distance used for computing the operation start time.

10. The node apparatus in accordance with claim 1, wherein:
the delay computing device determines a distance computed and communicated by an external system, to be the distance used for computing the operation start time.

11. The node apparatus in accordance with claim 1, wherein:
the delay computing device obtains the topology change part used for obtaining the distance, from the route control message received by the message receiving device.

12. The node apparatus in accordance with claim 1, wherein:
the delay computing device obtains the topology change part used for obtaining the distance, from information determined and communicated by an external system.

13. The node apparatus in accordance with claim 1, wherein:
the delay computing device determines a value proportional to the distance between a topology change part and said node apparatus of oneself to be the operation start time for the route control operation by the route computing device and the message sending device.

14. The node apparatus in accordance with claim 1, wherein:
the delay computing device computes the operation start time for the route control operation by the route computing device and the message sending device, by using a computation method determined in accordance with a result of comparison between the distance up to the topology change part and a predetermined value.

15. The node apparatus in accordance with claim 14, wherein:
when the result of the comparison indicates that the distance up to the topology change part is larger than the predetermined value, the delay computing device uses the predetermined value as the distance so as to compute the operation start time for the route control operation by the route computing device and the message sending device.

16. The node apparatus in accordance with claim 14, wherein:
when the result of the comparison indicates that the distance up to the topology change part is larger than the predetermined value, the delay computing device sets the operation start time for the route control operation by the route computing device and the message sending device to be infinite.

17. The node apparatus in accordance with claim 1, wherein:
the delay computing device compares the computed operation start time with a predetermined value, and sets the operation start time to the predetermined value if the computed operation start time is larger than the predetermined value.

18. The node apparatus in accordance with claim 17, wherein:
the delay computing device determines the computed operation start time to be effective only when a result of the comparison indicates that the computed operation start time is smaller than the predetermined value.

19. The node apparatus in accordance with claim 1, wherein:
the execution control device has a route updating start delay timer device that measures, based on the operation start time computed by the delay computing device, a time up to the start of updating a route list by using the route computed by the route computing device, where the route list contains route information on the network used for the packet transfer.

20. The node apparatus in accordance with claim 19, wherein:
the execution control device has a delay operation device; and
when the time measured by the route updating start delay timer device reaches the operation start time, the delay operation device commands the route computing device to start the updating of the route list.

21. The node apparatus in accordance with claim 2, wherein:
the execution control device has a delay managing device; and
if the timer device is operating when the route control message is newly received by the message receiving device, then the delay managing device controls updating of the time measured by the timer device which is operating, based on a result of comparison between the operation start time computed by the delay computing device and the time measured by the timer device.

22. The node apparatus in accordance with claim 3, wherein:
the delay computing device uses the hop number, which is the number of nodes present between the topology change part and said node apparatus of oneself, as the distance used for computing the operation start time, where the topology change part is obtained from the route control message received by the message receiving device.

23. A route control method wherein when a topology change occurs on a network used for packet transfer between node apparatuses, the method is used for establishing a new normal route, and said method comprises:
a receiving step that receives a route control message which includes information required for determining a route on the network;
a route computing step that determines the route on the network based on the received route control message;
a sending step that sends a node apparatus a route control message which includes information required for said node apparatus to determine a route on the network;
a delay computing step wherein when receiving the route control message, the delay computing step computes an operation start time for the determination of the route on the network and the sending of the route control message, based on a distance between a topology change part and a node apparatus of oneself; and
an execution control step that controls the execution of the route determination and the route control message sending, based on the computed operation start time.

24. The route control method in accordance with claim 23, wherein:
the execution control step has a computation start time measuring step that measures a time up to the start of the route determination, based on the operation start time.

25. The route control method in accordance with claim 23, wherein:
the execution control step has a message transfer start time measuring step that measures a time up to the start of the route control message sending, based on the operation start time.

26. The route control method in accordance with claim 23, wherein:
the delay computing step uses the hop number, which is the number of nodes present between the topology change part and said node apparatus of oneself, as the distance used for computing the operation start time.

27. The route control method in accordance with claim 23, wherein:
the delay computing step uses the sum of costs for a path between the topology change part and said node apparatus of oneself, as the distance used for computing the operation start time.

28. The route control method in accordance with claim 23, wherein:
the delay computing step uses the number of autonomous systems present between the topology change part and said node apparatus of oneself, as the distance used for computing the operation start time.

29. The route control method in accordance with claim 23, wherein:
the delay computing step uses a shortest path tree generated by the route computing step, so as to determine the distance used for computing the operation start time.

30. The route control method in accordance with claim 23, wherein:
the delay computing step determines a distance computed and communicated by an external system, to be the distance used for computing the operation start time.

31. The route control method in accordance with claim 23, wherein:
the delay computing step obtains the topology change part used for obtaining the distance, from the route control message received by the receiving step.

32. The route control method in accordance with claim 23, wherein:
the delay computing step obtains the topology change part used for obtaining the distance, from information determined and communicated by an external system.

33. The route control method in accordance with claim 23, wherein:
the delay computing step determines a value proportional to the distance between a topology change part and said node apparatus of oneself to be the operation start time for the route determination and the route control message sending.

34. The route control method in accordance with claim 23, wherein:
the delay computing step computes the operation start time for the route determination and the route control message sending, by using a computation method determined in accordance with a result of comparison between the distance up to the topology change part and a predetermined value.

35. The route control method in accordance with claim 34, wherein:
when the result of the comparison indicates that the distance up to the topology change part is larger than the predetermined value, the delay computing step uses the predetermined value as the distance so as to compute the operation start time for the route determination and the route control message sending.

36. The route control method in accordance with claim 34, wherein:
when the result of the comparison indicates that the distance up to the topology change part is larger than the predetermined value, the delay computing step sets the operation start time for the route determination and the route control message sending to be infinite.

37. The route control method in accordance with claim 23, wherein:
the delay computing step compares the computed operation start time with a predetermined value, and sets the operation start time to the predetermined value if the computed operation start time is larger than the predetermined value.

38. The route control method in accordance with claim 37, wherein:
the delay computing step determines the computed operation start time to be effective only when a result of the comparison indicates that the computed operation start time is smaller than the predetermined value.

39. The route control method in accordance with claim 23, wherein:
the execution control step has a route updating start time measuring step that measures, based on the operation start time computed by the delay computing step, a time up to the start of updating a route list by using the route computed by the route computing step, where the route list contains route information on the network used for the packet transfer.

40. The route control method in accordance with claim 24, wherein:
the execution control step has a delay managing step; and if the time measuring step is being executed when the route control message is newly received by the receiving step, then the delay managing step compares the operation start time computed by the delay computing step using the new route control message with the time measured by the time measuring step which is being executed, and controls updating of the time measured by the time measuring step, based on a result of the comparison.

41. A route computation system which operates in an autonomous system, and includes a node apparatus and a damaged part estimating apparatus which are connected via an internal network within the autonomous system, wherein:
when a topology change occurs on a network used for packet transfer between node apparatuses, the route computation system performs dynamic route control for establishing a new normal route;
the damaged part estimating apparatus comprises:
a damaged part estimating device that estimates a topology change part; and
a damaged part communicating devise that communicates the topology change part estimated by the damaged part estimating device to the node apparatus; and
the node apparatus comprises:
a message receiving device that receives, from another node apparatus, a route control message which includes information required for determining a route on the network;
a damaged part receiving device that receives the topology change part from the damaged part estimating apparatus;
a route computing device that determines the route based on the received route control message;
a message sending device that sends another node apparatus a route control message which includes information required for said another node apparatus to determine a route on the network;
a delay computing device wherein when receiving the route control message by the message receiving device, the delay computing device computes an operation start time for route control operation executed by the route computing device and the message sending device, based on a distance between the node apparatus of oneself and the topology change part received by the damaged part receiving device; and
an execution control device that controls the execution of the route control operation by the route computing device and the message sending device, based on the operation start time computed by the delay computing device.

42. A route computation system which operates in an autonomous system, and includes a node apparatus and a distance estimating apparatus which are connected via an internal network within the autonomous system, wherein:
when a topology change occurs on a network used for packet transfer between node apparatuses, the route computation system performs dynamic route control for establishing a new normal route;
the distance estimating apparatus comprises:
a distance estimating device that estimates a distance between the node apparatus and a topology change part; and
a distance communicating devise that communicates the distance estimated by the distance estimating device to the node apparatus; and
the node apparatus comprises:
a message receiving device that receives, from another node apparatus, a route control message which includes information required for determining a route on the network;
a distance receiving device that receives, from the distance estimating apparatus, the distance up to the topology change part;
a route computing device that determines the route on the network based on the received route control message;
a message sending device that sends another node apparatus a route control message which includes information required for said another node apparatus to determine a route on the network;
a delay computing device wherein when receiving the route control message by the message receiving device, the delay computing device computes an operation start time for route control operation executed by the route computing device and the message sending device, based on the distance up to the topology change part, which was received by the distance receiving device; and
an execution control device that controls the execution of the route control operation by the route computing device and the message sending device, based on the operation start time computed by the delay computing device.

43. A route computation apparatus connected to at least one node apparatus among node apparatuses wherein when a topology change occurs on a network used for packet transfer, the route computation apparatus performs dynamic route control for establishing a new normal route, and the route computation apparatus comprises:
a message receiving device that receives, from said at least one node apparatus, a route control message which includes information required for determining a route on the network;
a route computing device that determines the route on the network based on the received route control message;
a message sending device that sends another node apparatus via said at least one node apparatus, a route control message which includes information required for said another node apparatus to determine a route on the network;
a delay computing device wherein when receiving the route control message by the message receiving device, the delay computing device computes an operation start time for route control operation executed by the route computing device and the message sending device, based on a distance between a topology change part and said at least one node apparatus; and
an execution control device that controls the execution of the route control operation by the route computing device and the message sending device, based on the operation start time computed by the delay computing device.

* * * * *